US006494722B1

(12) United States Patent
Sakamoto et al.

(10) Patent No.: US 6,494,722 B1
(45) Date of Patent: Dec. 17, 2002

(54) WIRE HARNESS CIRCUIT CONFIGURATION METHOD AND WIRE HARNESS

(75) Inventors: Masami Sakamoto, Aichi-ken (JP); Yutaka Matsuoka, Aichi-ken (JP); Mitsutoshi Nakamura, Aichi-ken (JP); Yoshinobu Seki, Aichi-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/640,174

(22) Filed: Aug. 17, 2000

(30) Foreign Application Priority Data

Aug. 18, 1999 (JP) .......................... 11-231864
Aug. 18, 1999 (JP) .......................... 11-231899

(51) Int. Cl.$^7$ .............................. H01R 12/00
(52) U.S. Cl. ................. 439/76.2; 439/74; 439/75; 439/724; 439/404
(58) Field of Search ................ 439/76.2, 76.1, 439/724, 364, 271, 65, 66, 69, 404, 402, 75

(56) References Cited

U.S. PATENT DOCUMENTS

| 3,371,249 A | * | 2/1968 | Prohofsky ................ 439/75 |
| 4,850,884 A | * | 7/1989 | Sawai et al. .............. 439/76 |
| 4,897,042 A | * | 1/1990 | Saka et al. ............... 439/404 |
| 4,959,018 A | * | 9/1990 | Yamamoto ................ 439/76 |
| 5,057,026 A | * | 10/1991 | Sawai et al. .............. 439/76 |
| 5,067,905 A | * | 11/1991 | Matsumoto et al. ........ 439/76 |
| 5,501,605 A | * | 3/1996 | Ozaki et al. .............. 439/34 |
| 5,653,607 A | * | 8/1997 | Saka et al. ............... 439/402 |
| 5,667,389 A | * | 9/1997 | Kidd et al. ............... 439/75 |
| 5,722,851 A | * | 3/1998 | Onizuka et al. ........... 439/404 |
| 5,729,436 A | * | 3/1998 | Yoshigi et al. ........... 439/76.2 X |
| 5,755,596 A | * | 5/1998 | Watson .................... 439/608 |
| 5,920,034 A | * | 7/1999 | Saka et al. ............... 174/59 |
| 6,249,636 B1 | * | 6/2001 | Daoud .................... 385/137 |

FOREIGN PATENT DOCUMENTS

| JP | 6-54214 | 7/1994 |
| JP | 6-80318 | 11/1994 |

* cited by examiner

*Primary Examiner*—Tho D. Ta
*Assistant Examiner*—Larisa Tsukerman
(74) *Attorney, Agent, or Firm*—Finnegan, Henderson, Farabow, Garrett, & Dunner, L.L.P.

(57) ABSTRACT

A method of assembling a wire harness circuit includes providing a plurality of module plates, attaching wire connection terminals to predetermined wires of a plurality of wire sub-harnesses, inserting one or more wire connection terminals into selected wire housing grooves on the module plates, laminating the module plates on each other so as to form a laminated body, and inserting at least one connection member into the laminated body through openings in the module plates to electrically connect selected wire connection terminals on respective module plates. A wire harness according to the invention includes a plurality of wire sub-harnesses, each wire sub-harness comprising a plurality of wires, a plurality of wire connection terminals engageable with preselected wires to establish an electrical connection, a plurality of module plates laminated on each other so as to form a laminated body, and at least one connection member insertable into the laminated body through openings in the module plates to electrically connect selected wire connection terminals on respective module plates.

27 Claims, 13 Drawing Sheets

WIRE HARNESS CIRCUIT CONFIGURATION METHOD AND WIRE HARNESS

BACKGROUND OF THE INVENTION

1. Field of the Invention

The present invention relates to a circuit configuration method. More specifically, the invention relates to a wire harness circuit configuration method which is capable of configuring a splice circuit or the like arbitrarily.

2. Brief Description of the Related Art

Related arts of the present invention shown in FIGS. 1 through 3 are disclosed in Japanese Utility Model Application Laid-Open No. 6-80318 (1994) and No. 6-54214 (1994).

A symbol J in FIG. 1 shows an electric connection box. This electric connection box J is schematically composed of a cover main body 1, sub-wire harnesses SW1, SW2 and SW3, a rear cover 2, a rear cover 3 and a rear cover 4. The cover main body 1 is made of synthetic resin having an insulating characteristic. The sub-wire harnesses SW1, SW2 and SW3 are sorted per load system and are made of a plurality of electric wires W. The rear cover 2 is connected to the sub-wire harness SW1. The rear cover 3 is connected to the sub-wire harness SW2. The rear cover 4 is connected to the sub-wire harness SW3. The rear covers 2, 3 and 4 are fixed to the cover main body 1.

As shown in FIG. 1, relay cavities 5, fuse cavities 6, female connector cavities 7 and fusible link cavities 8, for example, are formed suitably in positions of an outer face of the cover main body 1 corresponding to the rear covers 2, 3 and 4.

FIG. 2 is an exploded perspective view showing a main section of the electric connection box J viewed from the rear side. As shown in FIG. 2, bus bars 10 and 11 which are bent into L shape intervene between the cover main body 1 and the rear cover 2 and between the cover main body 1 and the rear cover 3. The bus bars 10 and 11 compose an internal circuit of the sub-wire harnesses SW1 and SW2 in the electric connection box J. Supporting walls 14 and 15 having bus bar sandwiching grooves 12 and 13 are arranged in a standing condition on an inner face of a ceiling wall 1a of the cover main body 1. A plurality of terminal housing chambers 17 corresponding to various relay terminals 16 are protruded at end and middle portions of the supporting walls 14 and 15. FIG. 3 is an equivalent circuit diagram showing a state that the sub-wire harnesses SW1 and SW2 are connected to the main section of the electric connection box J. In this case, when the sub-wire harness SW2 is lead, end portions of electric wires 9 hang or terminals of the end portions are damaged.

However, as shown in FIG. 1, in the first prior art, the rear covers 2, 3 and 4, to which the sub-wire harnesses SW1, SW2 and SW3 are connected respectively, are attached to the cover main body 1. Due to this structure, in the case where the circuit configuration becomes complicated, when a number of rear covers increases, a plane area (projection area) of the cover main body 1 increases. As a result, there arises a problem that the electric connection box J is enlarged. Particularly in the electric connection box to be mounted to an automobile, an installation space is limited, the enlargement of the electric connection box becomes a problem.

In addition, in this electric connection box J, the bus bars 10 and 11 which intervene between the cover main body 1 and the rear covers 2, 3 and 4 configure a circuit practically. For this reason, in the case where connection sections are added due to a change in the arrangement of the relay cavities 5, the fuse cavities 6 and the female connector cavities 7 and the fusible link cavities 8 provided to the cover main body 1 and due to a modification of the circuit, a pattern of the bus bars is changed or becomes complicated. For this reason, in the electric connection box to be attached to an automobile, in the case where the type and standard of cars are different, it is necessary to prepare bus bars having peculiar patterns. This prior art is the electric connection box J which has the bus bars 10 and 11 as circuit components, but the circuit is occasionally configured by electric wire wiring. In this case, different wiring connection works are required for respective types of the electric connection boxes.

Further, as shown in FIG. 1, since the electric connection box J which is a power supply section has a plurality of circuit sections, a lot of electric wires W are centered, and an assembly characteristic to an automobile is deteriorated.

SUMMARY OF THE INVENTION

The present invention has been achieved with such points in mind.

It therefore is an object of the present invention to provide a wire harness circuit configuration method and a wire harness which are capable of eliminating incomplete-connection of electric wires, simplifying and miniaturizing a structure of an electric connection box to be connected, forming a space-saving branch wiring section and improving versatility of wire harnesses so that the wire harnesses can be used between systems where types and standards of cars are different.

A first aspect of the invention provides a wire harness circuit configuration method including the steps of: laminating a plurality of sub-wire harnesses whose one end is connected to a connector on a load side and the other end is connected to branch wiring of an electric connection box; layering a plurality of electric wire groups which belong to an electric wire aggregate; and short-circuiting predetermined electric wires between the respective layers by means of connection members, thereby a desired circuit is configured.

Therefore, in the invention from the first aspect, the electric wire groups, which are composed of the predetermined electric wire(s) in the electric wire aggregate, are layered, and the predetermined electric wires on the different layers are short-circuited with each other by the connection members so that a desired circuit can be configured. For this reason, the layered electric wire groups and the connection members can form one portion of the circuit configuration in the electric connection box, and the structure of the electric connection box can be simplified. Therefore, in the present invention, the same parts can be used between power supply systems where the type and standard of cars are different, for example. As a result, the wire harness can be standardized or can be versatile, and the circuit configuration of the electric connection box can be simplified.

A second aspect of the invention depending from the first aspect provides the wire harness circuit configuration method further including the steps of: connecting electric wire connection terminals to the predetermined electric wires composing the electric wire groups on the respective layers; arranging the electric wire connection terminals connected to the electric wires belonging to each of the electric wire group so that the terminals are separated from each other on each of module plates; laminating a plurality of module plates on each other so as to form a laminated body; and putting the connection members through the laminated body so as to connect the predetermined electric wire connection terminals on the respective module plates with each other.

In the invention from the second aspect, the predetermined electric wire groups are arranged on the plural module plates so that the plural electric wire groups composing the electric wire aggregate can be layered. The module plates are laminated so that the predetermined electric wires can be arranged in an up-and-down direction. The electric wire connection terminals, to which the electric wires arranged in the up-and-down direction are connected in such a manner, can be connected to each other by putting the connection members through predetermined positions of the laminated body.

A third aspect of the invention depending from the first or the second aspect provides the wire harness circuit configuration method further including the steps of: housing the laminated body of the module plates and the connection members which are put through the laminated body in a housing; and forming a branch connector section for allowing end portions of the connection members to function as connector terminals in the housing.

In the invention having such a structure, the laminated body is housed in the housing so as to be capable of being held there. Moreover, the branch connector section is formed in the housing, and the branch connector allows the end portions of the connection members to function as the connector terminals. For this reason, branch wiring can be obtained even in a position separated from the electric connection box. For this reason, a plurality of branch wirings can be efficiently obtained from an middle portion of the wire harness arranged in the vicinity of a load arranged in a position separated from an interior light and sunroof system and a load system in the vicinity of an instrument panel.

In addition, a fourth aspect of the invention depending from one aspect among the first aspect to the third aspect provides the wire harness circuit configuration method that the electric wire connection terminals are connected to the end or middle portions of the predetermined electric wires.

Therefore, when the middle portions of the electrical wires are connected to the electric wire connection terminals, the circuit can be configured or the branch wiring can be made in a position separated from the electric wire connection box without cutting halfway portions of the electric wires. Therefore, waste of electric wires can be prevented.

A fifth aspect of the invention depending from one aspect among the first aspect to the fourth aspect provides the wire harness circuit configuration method that the laminated body and the connection members form one portion of a branch circuit in the electric wire connection box.

In the invention having such a structure, the layered plural electric wire groups and the connection members form one portion of the branch circuit in the electric connection box so that a number of branch wirings to be connected with the electric connection box can be reduced. For this reason, the wiring operation can be performed quickly and securely, and the cost of the wiring operation can be reduced. Particularly, since bus bars having peculiar pattern according to the type and standard of cars should not prepared in the electric connection box, the cost can be reduced.

A sixth aspect of the invention provides a wire harness, comprising: a plural bunches of sub-harnesses composed of a plurality of electric wires, each of the sub-harnesses having an electric wire aggregate, one end of each of the sub-harnesses being connected to a load side and the other side of each of the sub-harnesses being connected to a branch circuit on a power supply side, wherein module members of circuit configuration connection means, which can form an arbitrary circuit by connecting the means to at least one of predetermined electric wires in the electric wire aggregate of another sub-harness or a branch circuit, are connected to the other sides of the predetermined electric wires to be connected to the branch circuit together with predetermined electric wires in the electric wire aggregate of another sub-harness in the plural electric wires of the sub-harnesses.

In this wire harness, since the other sides of the predetermined electric wires of the sub-harness are connected to the module members, these sides of the predetermined electric wires can be collected. As a result, the predetermined electric wires can be in a so-called completed state. As a result, the electric wires can be prevented from hanging, and the terminals of the end portions of the electric wires can be prevented from being damaged.

Further, in this wire harness, the circuit configuration connection means is connected to the other sides of the electric wires of the sub-harness so as to be connected to predetermined electric wires of another sub-harness or the branch circuit. As a result, the plural electric wires can be short-circuited with each other. Therefore, one portion of the circuit configuration in the electric connection box can be configured directly. As a result, the structure of the electric connection box can be simplified, and the same parts can be used between power supply systems where the type and standard of cars are different for example. As a result, the wire harness can be standardized and be versatile. Therefore, the cost of the wire harness can be reduced.

A seventh aspect of the invention depending from the sixth aspect provides the wire harness that the circuit configuration connection means has a laminated body which is formed by laminating the module members in which the other sides of the predetermined electric wires of the plural electric wires in the electric wire aggregate of the sub-harnesses are independently arranged and housed, and connection members which are attached to the laminated body and connect the arbitrary electric wires arranged on the module members to each other.

According to this wire harness, in addition to the function of the invention depending from the first aspect, when the electric wires on the module members composing the laminated body are connected with each other by the connection members, the branch circuit or a predetermined circuit can be formed arbitrarily. Moreover, when the connection members are connected to a branch connection section, a suitable power can be fed from the branch connection section to a load system, for example.

An eighth aspect of the invention depending from the sixth or seventh aspect provides the wire harness that the module members includes: a plate main body; electric wire housing grooves which are provided on one side face of the plate main body and into which the terminals of the predetermined electric wires of the sub-harnesses are housed; and electric wire connection terminals which are arranged in the electric wire housing grooves and to which terminals or intermediate portions of the predetermined electric wires of the sub-harnesses are connected.

In the invention from the eighth aspect, the terminals or the intermediate portions may be connected to the electric wire connection terminals. In this invention, when the intermediate portions of the electric wires are connected to the electric wire connection terminals, the electric connection box and the circuit configuration connection means can be arranged in positions separated from each other without cutting halfway portions of the electric wires. As a result, the electric connection box and the circuit configuration connection means can be arranged in suitably separated positions. For this reason, the circuit configuration connection means can be easily arranged in a position where the attaching operation to an automobile is easy, and the operability can be improved.

A ninth aspect of the invention depending from one aspect among the sixth aspect to the eighth aspect provides the wire harness that: the connection members have a length across the predetermined module members and are composed of connection bars having conductivity; the electric wire connection terminals respectively have engagement connection sections which can contact with the connection members; and through holes into which the connection members are inserted are formed on the plate main body correspondingly to the positions where the engagement connection sections are arranged.

In the invention from the ninth aspect, in addition to the function of the invention from the third aspect, the connection members composed of connection bars are inserted into the arbitrary through holes of the plate main body composing the module members, and the connection members can be electrically connected to the engagement connection sections on the arbitrary electric connection tools to which the predetermined electric wires are connected. As a result, when the electric wires are selected, the positions of the electric wire connection terminals are determined and the electric wires which are short-circuited with each other by the connection members are set, an arbitrary circuit can be configured and the wiring branch can be made simply and securely.

A tenth aspect of the invention depending from one aspect among the sixth aspect to the ninth aspect provides the wire harness that the electric wire connection terminals have a pair of press-fitting blades, and when the electric wires are press-fitted into the press-fitting blades, the press-fitting blades cut into the covered sections of the electric wires so as to contact with conductor sections.

In the above invention, when the electric wires are press-fitted between the press-fitting blades, the press fitting blades easily cut into the covered sections of the electric wires so that the conductor sections are connected to the electric wire connection terminals. For this reason, in the present invention, the electric wires can be easily attached to the modules where the electric wire connection terminals are arranged, and the operability can be improved.

An eleventh aspect of the invention depending from one aspect among the sixth aspect to the tenth aspect provides the wire harness that the circuit configuration connection means has a housing for housing the laminated body, and the branch connection sections are formed on the housing.

In the above invention, the laminated body which is constituted by laminating the modules is held in the housing. In this invention, since the branch connection sections are formed in the housing, the branch connection sections are connected to the load system so that the convenience is improved.

A twelfth aspect of the invention depending from one aspect among the sixth aspect to the eleventh aspect provides the wire harness that the circuit configuration connection means is provided integrally with the electric connection box.

In the above invention, the circuit configuration connection means is provided integrally with the electric connection box so that a cover which is peculiar to the circuit configuration connection means can be omitted. Moreover, since one portion of the configured circuit in the electric connection box can be formed by the circuit configuration connection means partly, the structure of the electric connection box can be simplified. Particularly in this invention, it is convenient to the case where a plurality of load systems are arranged in the vicinity of the electric connection box.

A thirteenth aspect of the invention depending from one aspect among the sixth aspect to the twelfth aspect provides the wire harness that the circuit configuration means is provided separately from the electric connection box.

In the above invention, since the electric connection box and the circuit configuration connection means are provided separately, the electric connection box can be miniaturized, and an installation space for the electric connection box can be reduced. Moreover, the branch wiring of the electric connection box is lengthened, and the circuit configuration connection means is separated from the electric connection box. As a result, the circuit configuration connection means, which bear one portion of the configured structure in the electric connection box is allotted, can be arranged in the vicinity of the load system, or the circuit configuration connection means can be connected directly to the load system. Therefore, hanging of the electric wires can be suppressed.

A fourteenth aspect of the invention depending from one aspect among the sixth aspect to the thirteenth aspect provides the wire harness that the circuit configuration connection means can form one portion of the branch circuit in the electric connection box.

In the above invention, the circuit configuration connection means form one portion of the branch circuit in the electric connection box so that a number of the branch wirings for connecting the electric connection box to the circuit configuration connection means can be reduced. As a result, The wiring work can be executed quickly and securely, and the cost for the wiring work can be reduced.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
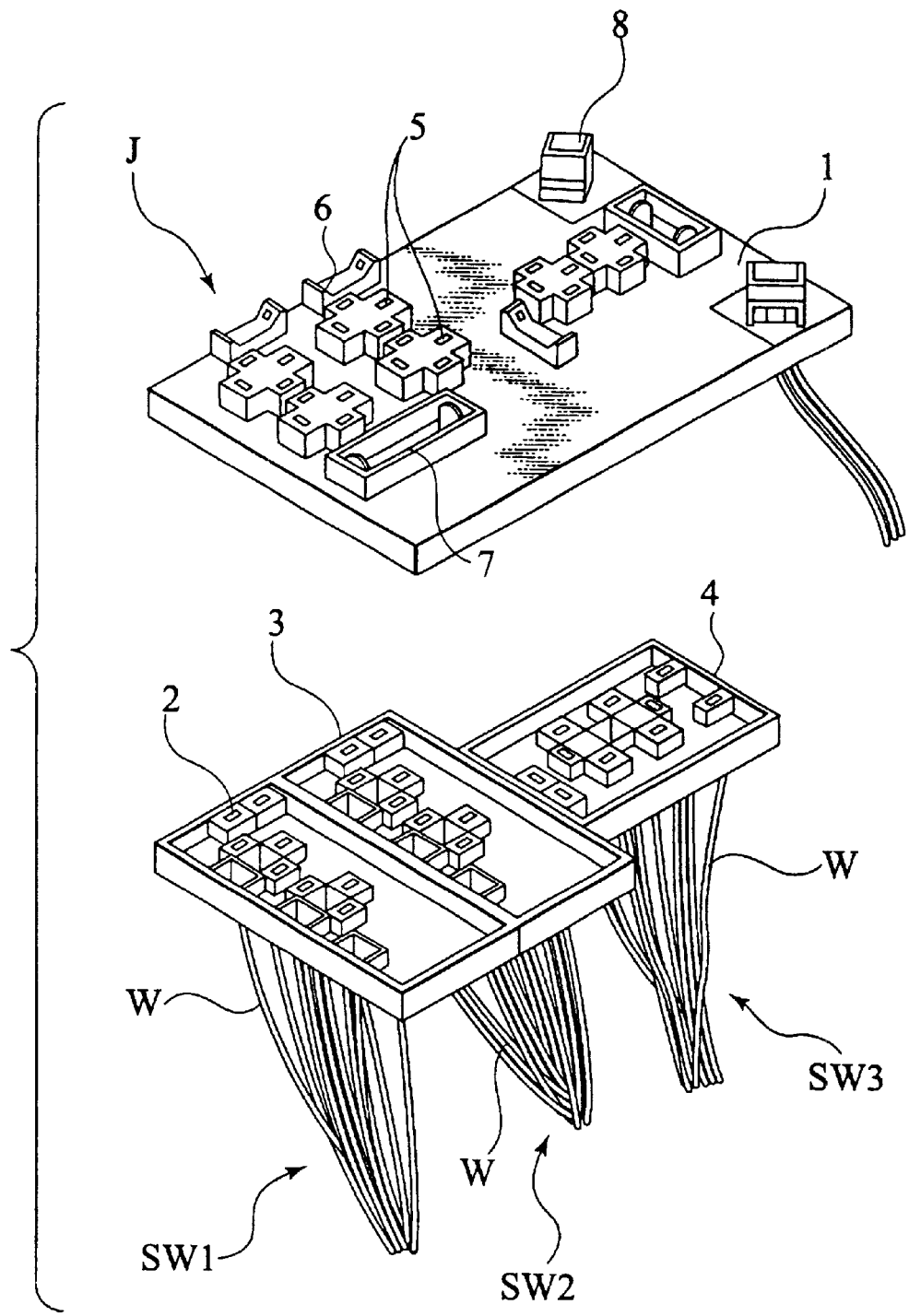
FIG. 1 is an exploded perspective view showing a prior electric connection box.
Figure 2:
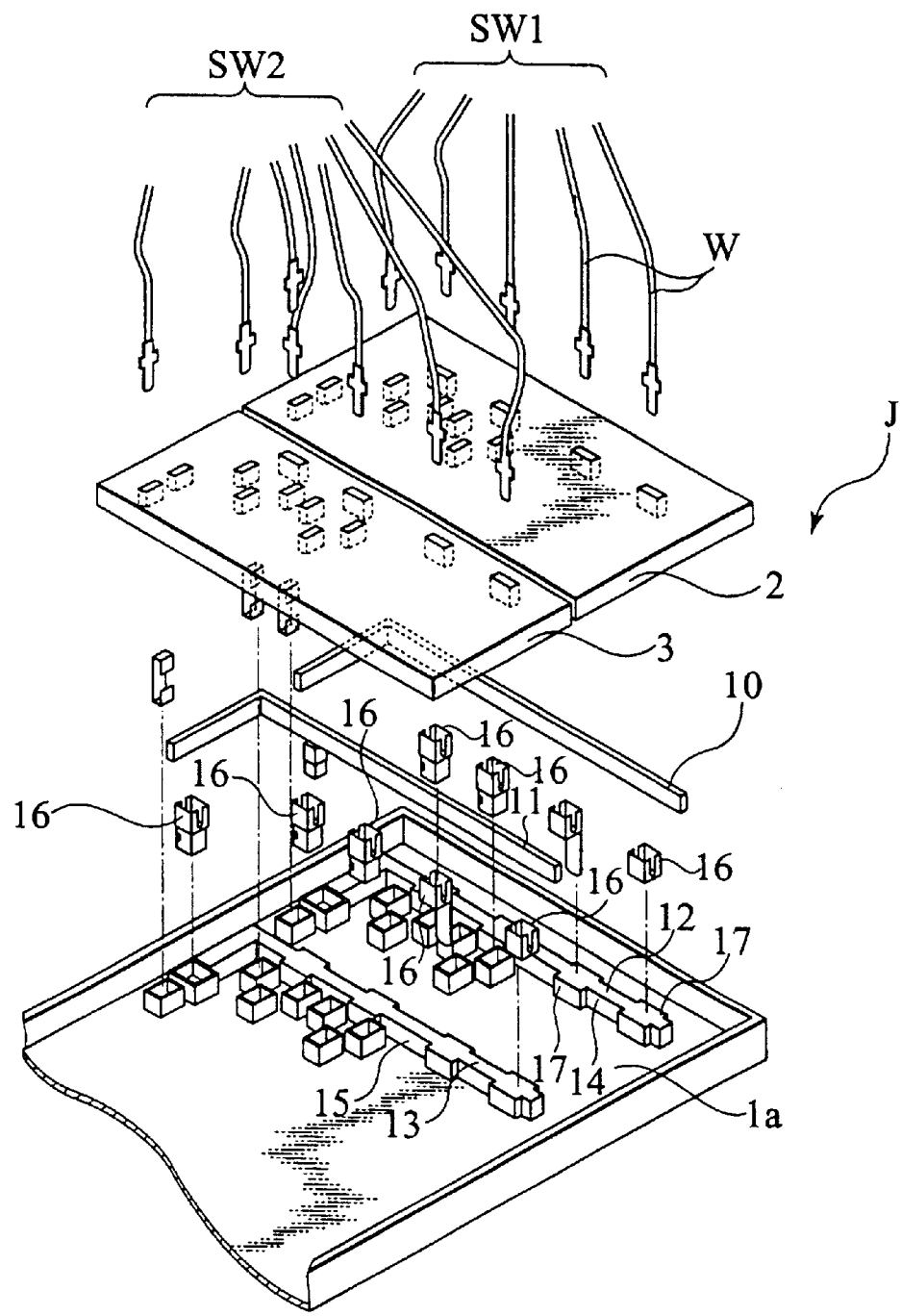
FIG. 2 is an exploded perspective view showing a prior electric connection box.
Figure 3:
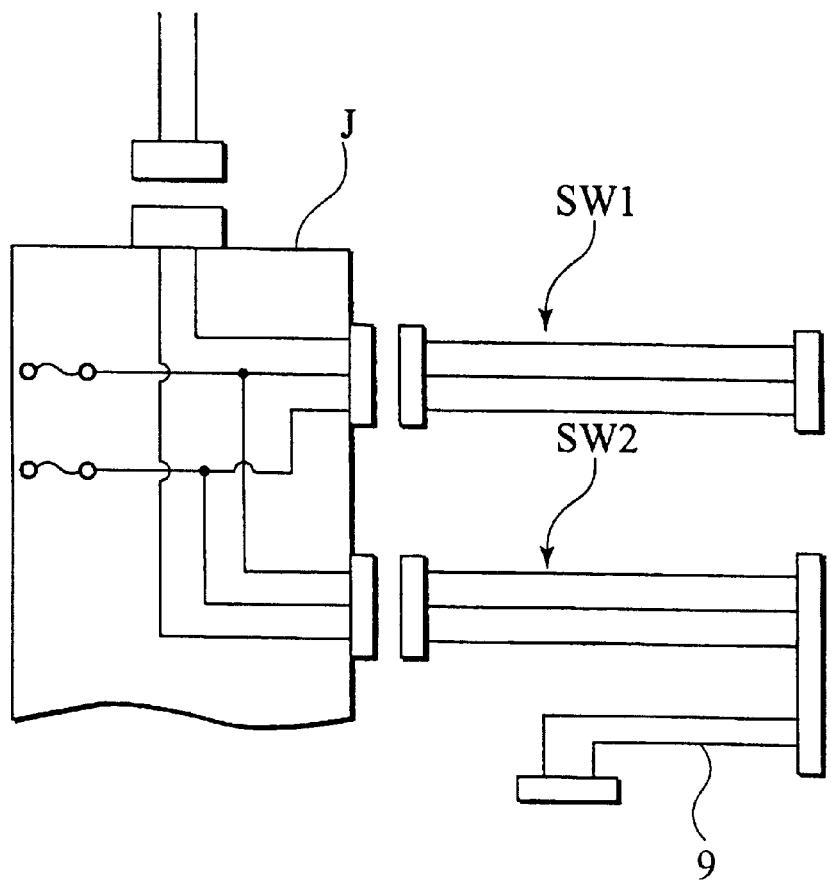
FIG. 3 is an equivalent circuit diagram showing a state that sub-wire harnesses are connected to the prior electric connection box.

There will be detailed below the preferred embodiments of the present invention with reference to the accompanying drawings. Like members are designated by like reference characters.

Referring now to FIG. 4 to FIG. 11, a first embodiment of the present invention will be explained hereinafter.

Figure 4:
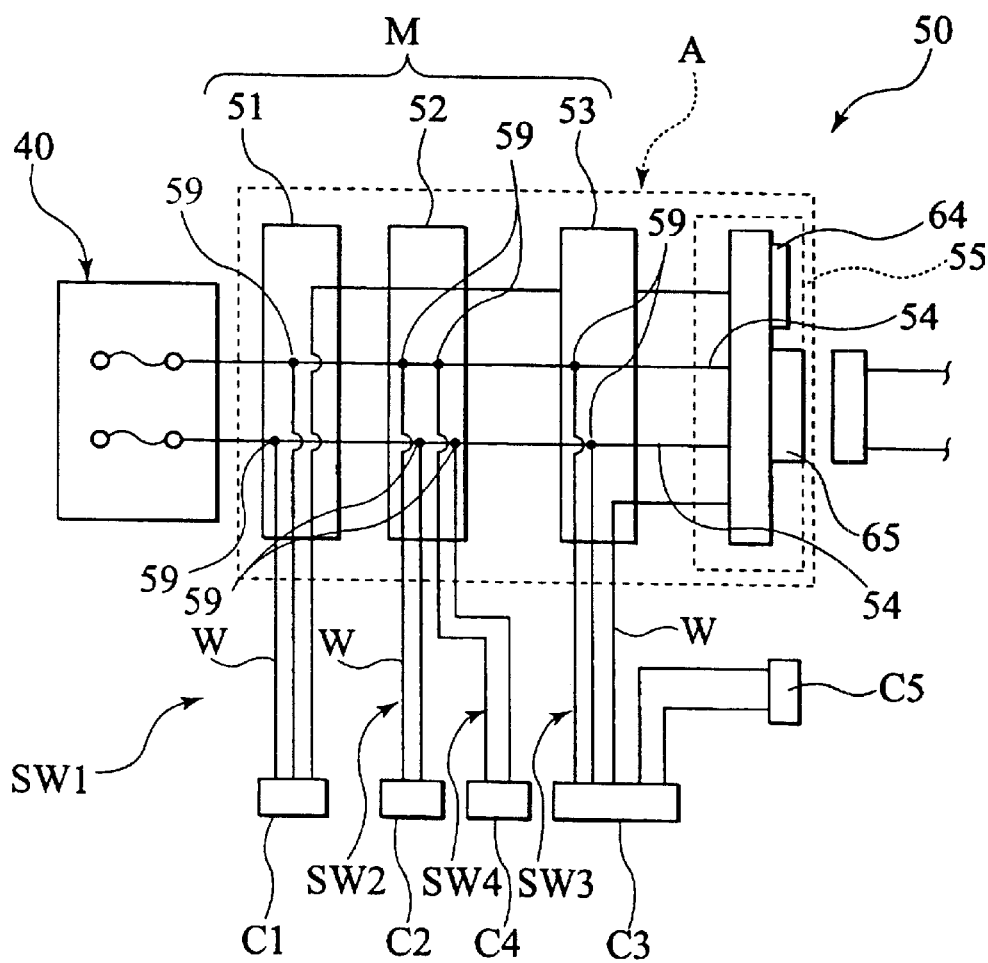
FIG. 4 is an equivalent circuit diagram showing a state that wire harnesses are attached to an electric connection box according to a first embodiment.

FIG. 4 shows an equivalent circuit that a wire harness 50 is connected to a branch circuit of an electric connection box 40. In FIG. 4, the wire harness 50 is composed of sub-harnesses SW1, SW2, SW3 and SW4. The sub-harnesses SW1, SW2, SW3 and SW4 are composed of an electric wire aggregate composed of a plurality of electric wires W, connectors C1, C2, C3, C4 and C5 which are connected to one side of the electric wire aggregate and to a load, and circuit configuration connection means A which is connected to the other side of the sub-harnesses SW1, SW2, SW3 and SW4. Module members M (module plate 51, module plate 52 and module plate 53) of the circuit configuration connection means A are connected to the other side of the sub-harnesses SW1, SW2, SW3 and SW4 so that a plurality of electric wire groups are layered.

The other sides of the plural electric wires of the sub-harness SW1 are connected to the module plate 51. The sub-harness SW2 and the electric wires of the sub-harness SW4 is connected to the module plate 52. Some of the plural electric wires of the sub-harness SW3 are connected to the module plate 53, and the rest of the electric wires are connected to the connector C5.

In the present embodiment, a plurality of electric wires which belong to the electric wire aggregate of the sub-harnesses SW1, SW2, SW3 and SW4 are short-circuited with each other by connection members so that a desired circuit can be configured.

Figure 5:
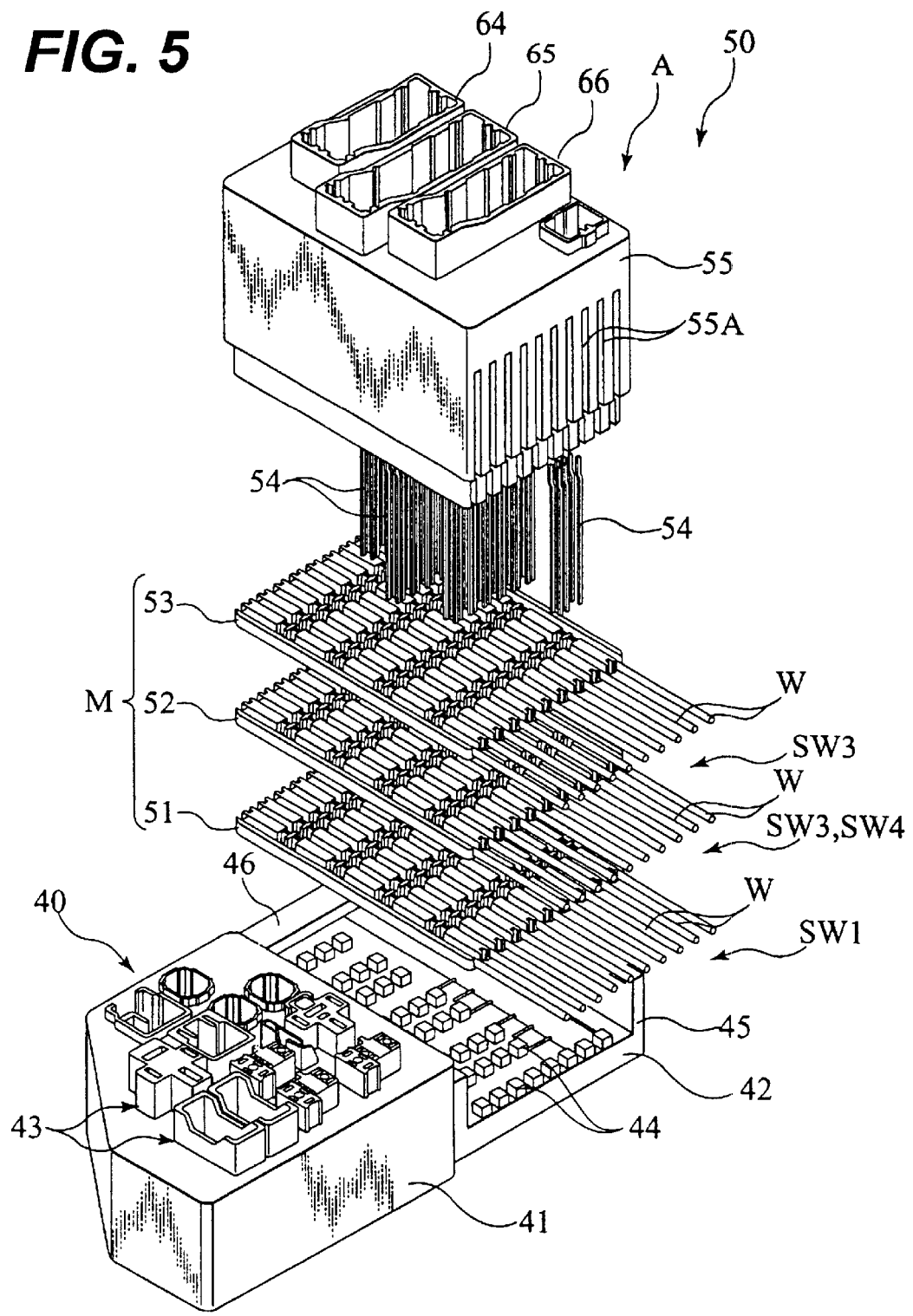
FIG. 5 is an exploded perspective view showing a wire harness circuit configuration method according to the first embodiment of the present invention.
Figure 6:
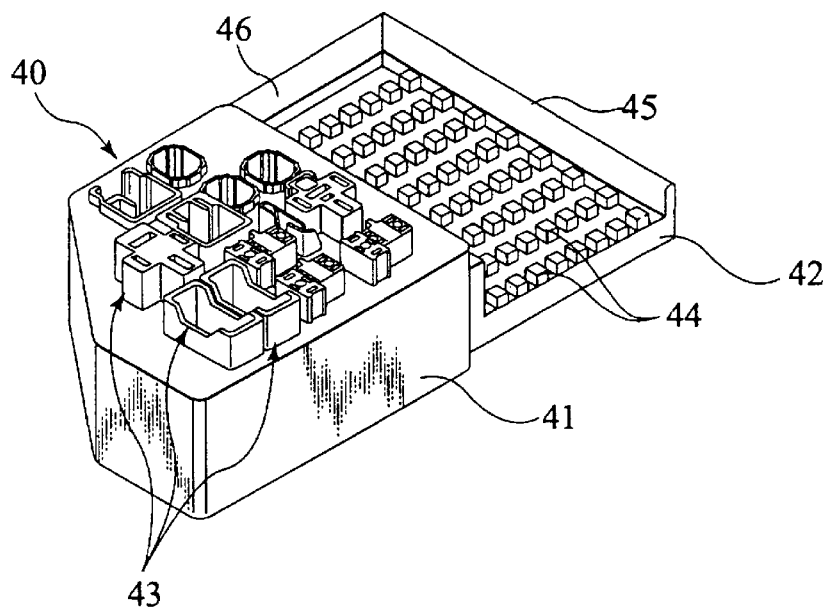
FIG. 6 is a perspective view of the electric connection box according to the first embodiment.

As shown in FIGS. 5 and 6, the electric connection box 40 has a housing main body 41, and a branch plate section 42 which is extended from a side portion of the housing main body 41. Various cavities 43 such as relay cavities, fuse cavities, female connector cavities and fusible link cavities are formed suitably on an upper face of the housing main body 41. Moreover, side walls 45 and 46 with predetermined height are provided in a standing condition on two side edge portions which are a side edge portion opposed to the housing main body 41 and a side edge portion adjacent to the first side edge portion of the branch plate section 42 Further, a plurality of branch wirings 44 which are branched from an internal circuit (not shown) of the housing main body 41 are arranged and laid on an upper face of the branch plate section 42 so that a branch circuit is configured. The circuit configuration connection means A is connected to the branch plate section 42.

The circuit configuration connection means A has a laminated body (see FIG. 10) 63 which is formed by laminating the module members (module plates 51, 52 and 53) M, and connection bars (connection members) 54 which are mounted to the laminated body 63 and connect the electric wires arranged and housed in the module members M. Moreover, the laminated body 63 and the connection members 54 are laminated in a state that they are housed in a split housing 55. When the split housing 55 is fixed to the branch plate section 42, the module members M and the connection members 54 are held between the split housing 55 and the branch plate section 42 in the electric connection box 40.

Figure 7:
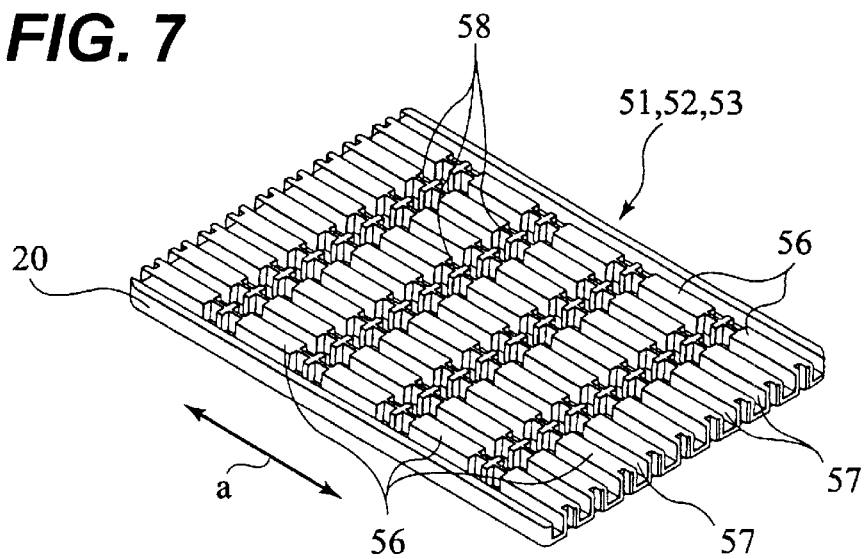
FIG. 7 is a perspective view of a module plate according to the first embodiment.
Figure 8:
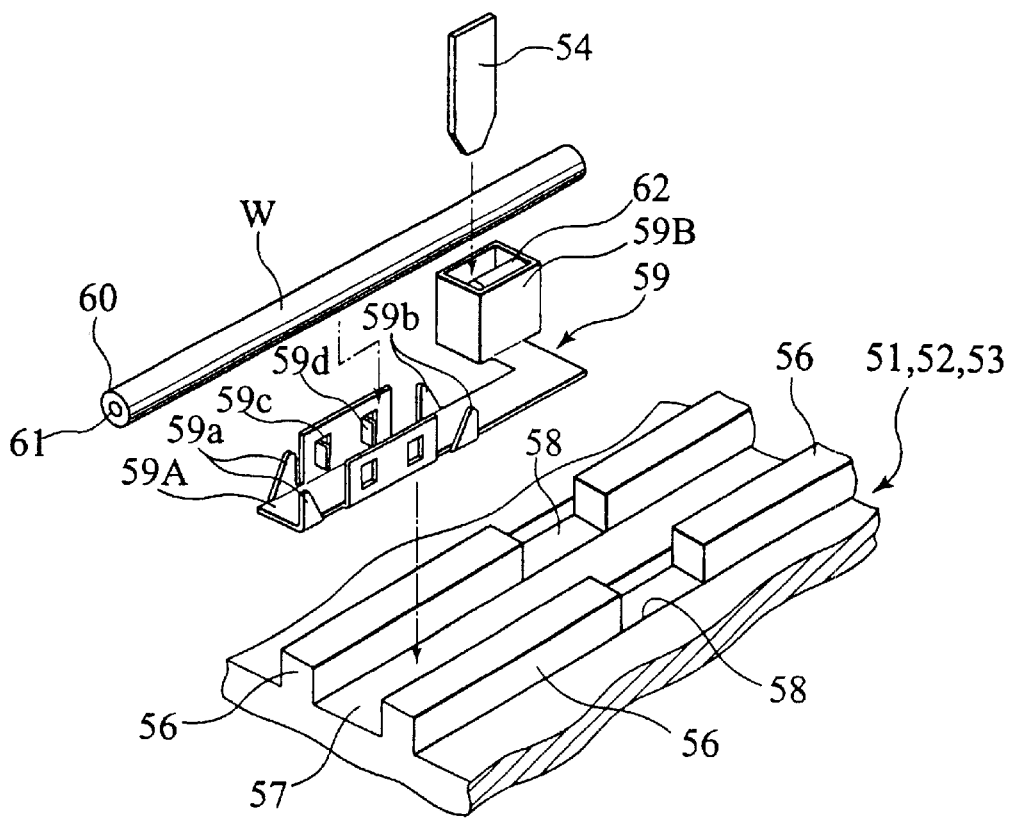
FIG. 8 is a perspective view of a main section for explaining an attached position of an electric wire connection terminal according to the first embodiment.

The module plates 51, 52 and 53 have a rectangular plate main body 20 whose area allows the plate main body 20 to be put on an upper face of the branch plate section 42, electric wire housing grooves 57 which are comparted on an upper face of the plate main body 20 by a plurality of partition walls 56, and an electric wire connection terminal 59 which is positioned in the electric wire housing groove 57 and to which the end or middle portions of the electric wires are connected. As shown in FIGS. 7 and 8, through holes 58 through which the connection members 54 are inserted are opened and formed in positions between the partition walls 56 arranged in a row direction which slightly avoid positions where the electric wires W are arranged.

The plural electric wire connection terminals 59 shown in FIGS. 8 and 9 are provided on the module plates 51, 52 and 53 having such a structure. The electric wire connection terminals 59 are arranged on the module plates 51, 52 and 53 according to a previously set layout such as the circuit configuration formed by the circuit configuration connection means A and the selection of a positions of the branch wiring.

An arbitrary circuit can be formed suitably by the circuit configuration connection means A according to the positions of the electric wire connection terminals 59 and the positions through which the connection bars 54 are inserted. For this reason, various branch sections and power circuits can be freely formed by the wire harness 50 used in the first embodiment so that versatility can be heightened.

There will be explained below a structure of the electric wire connection terminal 59 with reference to FIG. 8.

The electric wire connection terminal 59 is composed of an electric wire holding section 59A and an angular drum-shaped bar contact section 59B. The electric wire holding section 59A is arranged in the electric wire housing groove 57 between the partition walls 56 in a widthwise direction on the module plates 51, 52 and 53. The bar contact section 59B is positioned slightly sideways from the end portion of the electric wire holding section 59A. Two pairs of opposed bending pieces 59a and 59b and two pairs of press-fitting blades 59c and 59d are arranged in a standing condition on the electric wire holding section 59A. The bending pieces 59a and 59b are bent so as to hold the electric wire W. The electric wire W is press-fitted into the press-fitting blades 59c and 59d, and a covered section 60 of the electric wire W is cut so that the electric wire W is brought into contact and connected with a conductor section 61.

In addition, the angular drum-shaped bar contact section 59B is arranged so that its drum hole is connected to each of the plural through holes 58 formed on the module plates 51, 52 and 53. A contact spring piece 62 for press-contacting with the connection bar 54 is provided in the drum hole of the bar contact section 59B. The electric wire connection terminal 59 is set so as to be press-fitted between the partition walls 56. The electric wire connection terminal 59 is press-fitted between the partition walls 56 so as to be held at the side of the module plate.

The electric wire connection terminals 59 are arranged in suitable positions of the module plates 51, 52 and 53. The module plates 51, 52 and 53 are laminated and the connection bars 54 are inserted therein to so that a predetermined circuit can be configured.

There will be explained below simply a structure of the split housing 55 which holds the module plates 51, 52 and 53 to the branch plate section 42 of the electric connection box 40 so that module plates 51, 52 and 53 are branched and connected to the electric connection box 40.

Figure 11A:
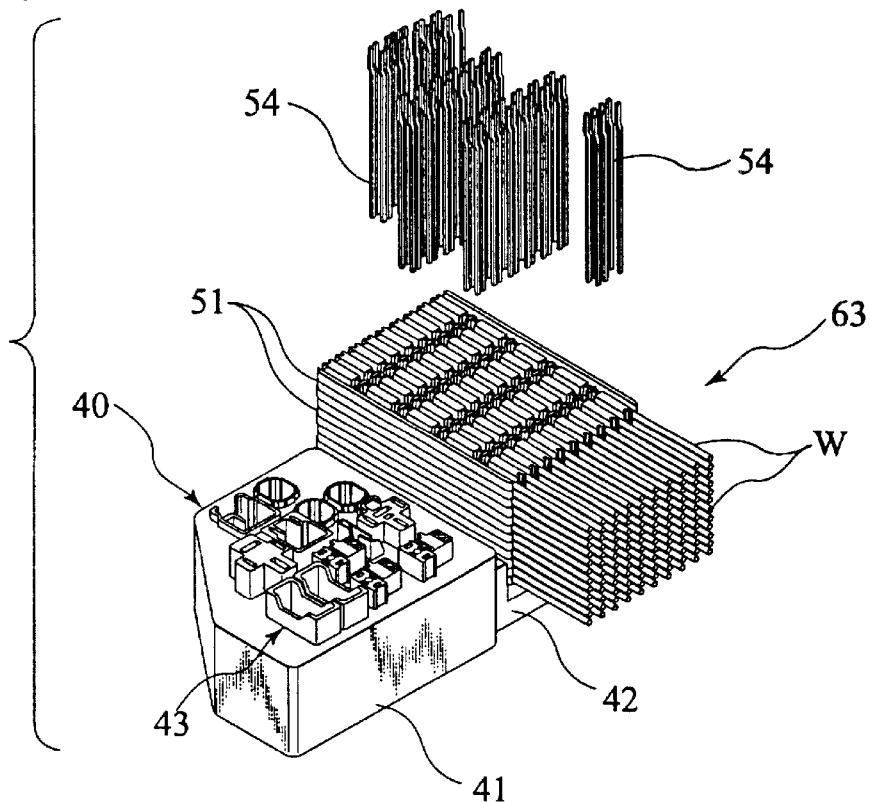
FIGS. 11A and 11B are perspective views showing wire harness circuit configuration steps according to the first embodiment.
Figure 11B:
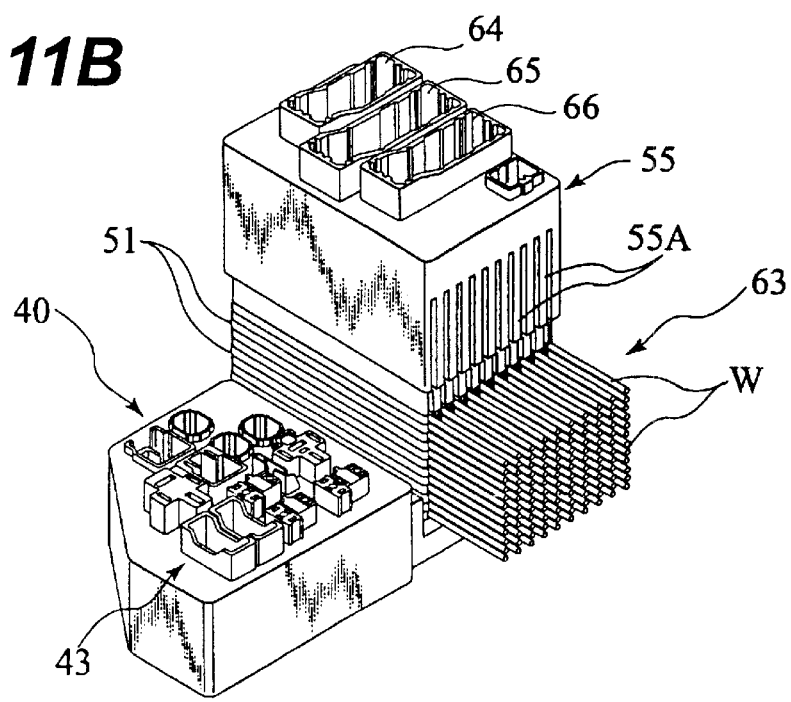

The split connector housing 55 covers the laminated body 63 of the module plates 51, 52 and 53 placed on the branch plate section 42 so as to be engaged with the branch plate section 42. In such a manner the laminated body 63 of the module plates are covered with the split housing 55 so that exposure of the electric wire connection terminals 59 and the connection bars 54 is prevented. Moreover, a plurality of slits 55A for leading out the electric wires W arranged on the module plates 51, 52 and 53 are formed parallel with an up-and-down direction (laminated direction) in the split housing 55. Moreover, as shown in FIGS. 5 and 11B, hood sections 64, 65 and 66 which compose the branch connector are formed on an upper face of the split housing 55. The end portions of the connection bars 54 are fixed into the hood sections 64, 65 and 66 in a standing condition as connector pins (connector terminals).

There was explained the structures of the respective members. Next, there will be explained below a circuit configuration method of the wire harness 50 according to the first embodiment with reference to FIGS. 9A through 11B. Here, the explanation is given as to the case where not less than three module plates are laminated and the reference numeral 51 is given to all the module plates.

Figure 9A:
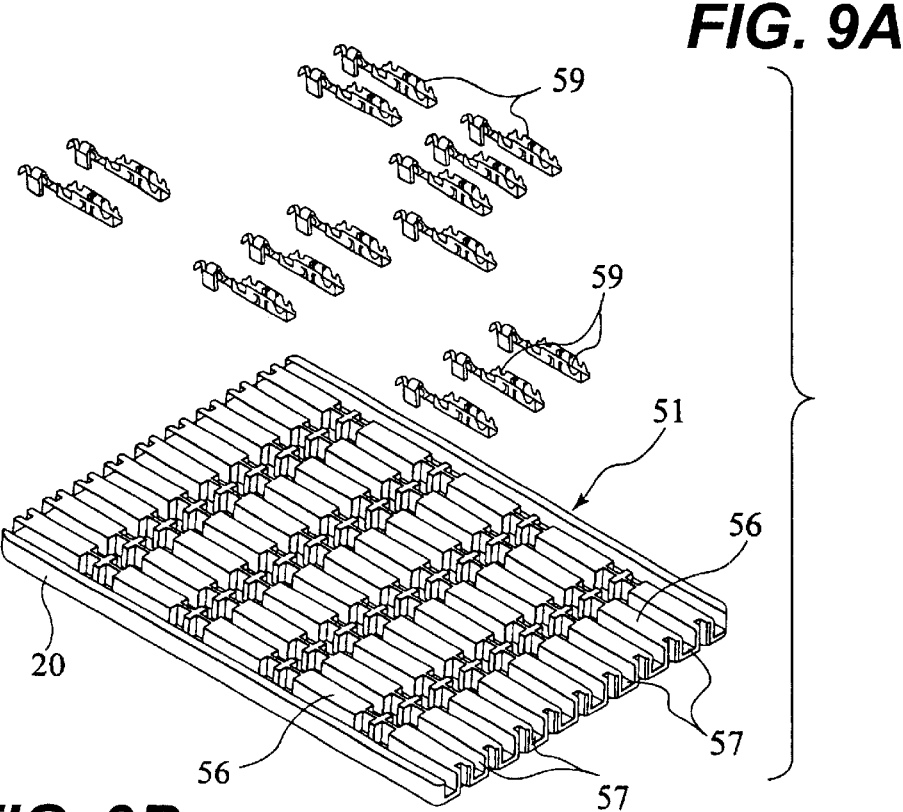
FIGS. 9A and 9B are perspective views showing wire harness circuit configuration steps according to the first embodiment.

As shown in FIG. 9A, the electric wire connection terminals 59 are respectively press-fitted into and arranged in the electric wire housing grooves 57 in predetermined positions of the respective module plates 51 so as to be fixed to the module plates 51. At this time, the electric wire connection terminals 59 are arranged so that the through holes 58 formed on the module plates 51 are connected with the drum holes of the bar contact sections 59B of the electric wire connection terminals 59.

Figure 9B:
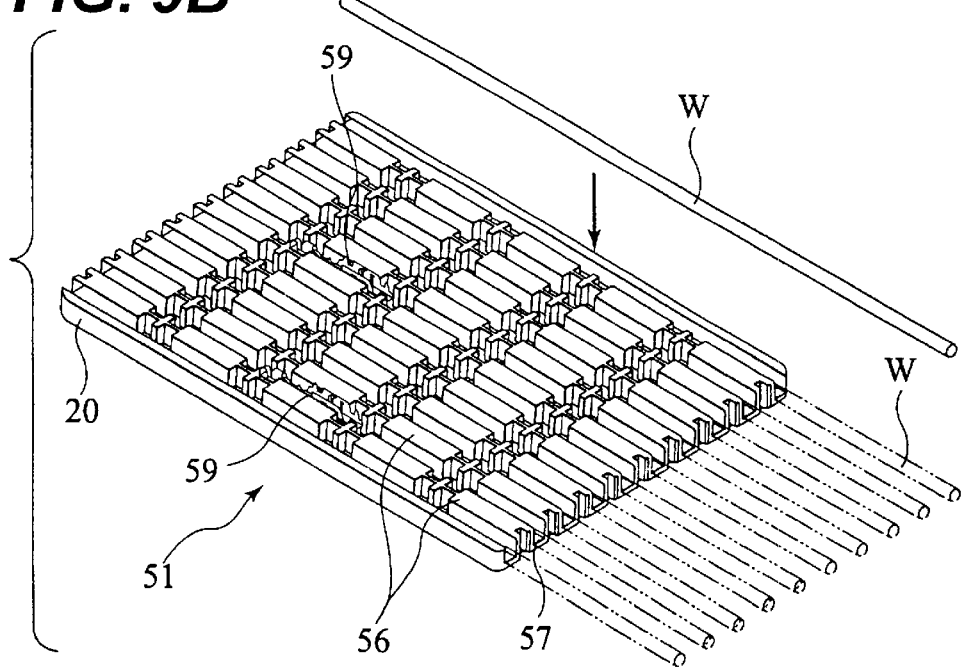

As shown in FIG. 9B, the electric wires W are connected to the electric wire connection terminals 59 arranged on the module plates 51. In order to connect the electric wires W to the electric wire connection terminals 59, the electric wires W are press-fitted between the press-fitting blades 59c and between the press-fitting blades 59d. As a result, the covered sections 60 of the electric wires W are cut and the conductor sections 61 are brought into contact and connected with the press-fitting blades 59c and 59d. Moreover, after the electric wires W are press-fitted between the press-fitting blades, the bending pieces 59a and 59b are bent so as to surround the electric wires W. As a result, the electric wires W rub can be fixed to the electric wire connection terminals 59.

Figure 10A:
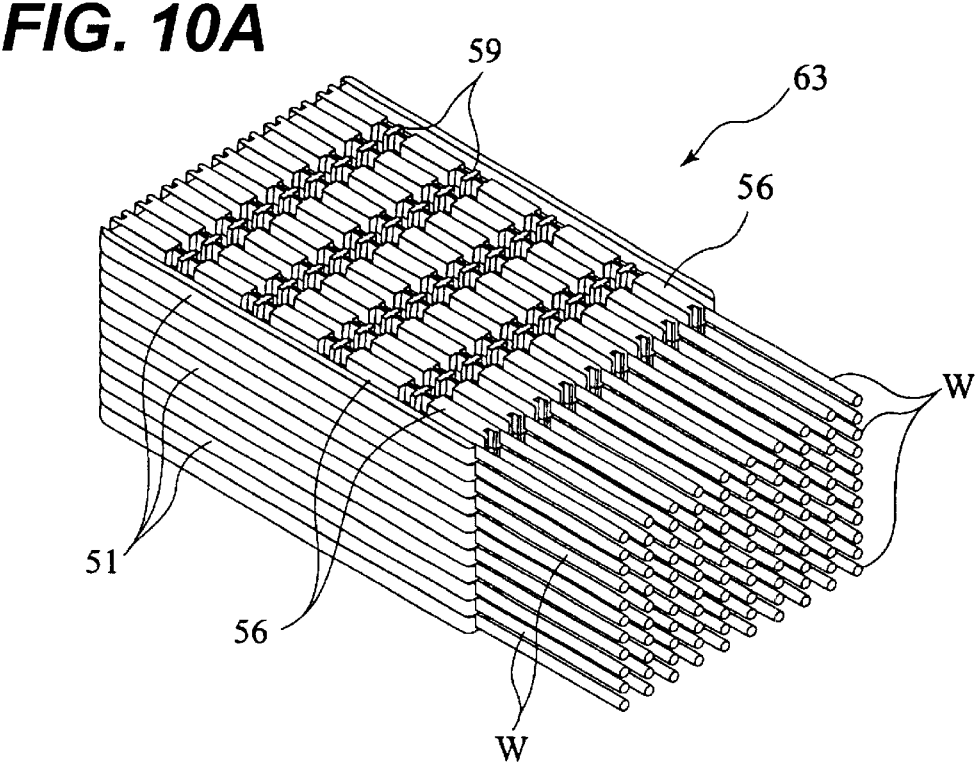
FIGS. 10A and 10B are perspective views showing wire harness circuit configuration steps according to the first embodiment.
Figure 10B:
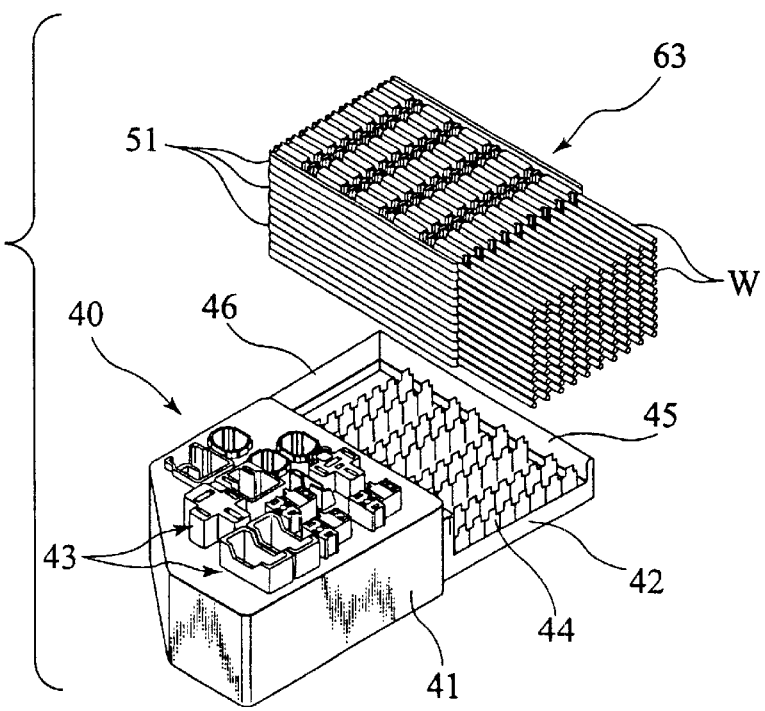

In the first embodiment, since the module plates 51 are arranged on the branch plate section 42, the end portions of the electric wires W are connected to the electric wire connection terminals 59. The electric wire groups connected to the module plates 51 compose sub-harnesses. 51 are laminated in a predetermined order so that the laminated body 63 is formed. As shown in FIG. 10B, the laminated body 63 is placed on the branch plate section 42. Further, as shown in FIG. 11A, the connection bars 54 are inserted into the predetermined through holes 58 of the topmost module plate 51 of the laminated body 63. The connection bars 54 are inserted until their lower end portions reach the branch plate section 42 of the electric connection box 40. The reasons to allow the lower end portions of the connection bars 54 to reach the branch plate section 42 are as follows. When the lower end portions of the connection bars 54 contact with the branch plate section 42, the connection bars 54 can be prevented from moving downward. The connection bars 54 can be connected with the branch wirings 44 arranged on the branch plate section 42 as the need arises.

As shown in FIG. 11B, the split housing 55 is put over the laminated body 63 placed on the branch plate section 42, and the lower end portion of the split housing 55 is engaged with the branch plate section 42 by engagement means, not shown. Even when the split housing 55 is put over the laminated body 63, the electric wires W on the respective rows are housed in the slits 55A of the split housing 55. For this reason, the electric wires W are not prevented from being lead out from the split housing 55. Therefore, when the sub-harnesses SW1, SW2, SW3 and SW4 are lead, the electric wires can be prevented from hanging and the terminals of the end portions of the electric wires can be prevented from being damaged.

In addition, when the split housing 55 is put over the laminated body 63, the upper end portions of the connection bars 54 stand in the hood sections 64, 65 and 66 formed on the upper face of the split housing 55. The length of the connection bars 54 is determined so that the above state is obtained. When the upper end portions of the connection bars 54 stand in the hood sections 64, 65 and 66 in such a manner, the upper end portions of the connection bars 54 function as the connector pins (connector terminals) so that the branch connector is constituted. The branch connector can be connected suitably to a load system of an automobile, for example.

The step of configuring the circuit of the wire harness 50 and the step of attaching the wire harness 50 to the electric connection box 40 can be completed in such a manner.

In the first embodiment, the circuit configuration connection means A, which is formed by the circuit configuration method and is provided to the wire harness 50, is provided integrally to the electric connection box 40. For this reason, the branch plate section 42 of the electric connection box 40 can be used as a cover of the circuit configuration connection means A. Moreover, the circuit configuration connection means A can bear the formation of one portion of the configured circuit in the electric connection box 40. For this reason, the structure of the electric connection box 40 can be simplified. Particularly in the first embodiment, it is convenient to the case where a plurality of load systems are arranged in the vicinity of the electric connection box.

In addition, in the first embodiment, the predetermined electric wire(s) W in the electric wire aggregate composing the wire harness 50 is (are) connected to the electric wire connection terminals 59 of the module plates 51 composing the circuit configuration connection means A. The connection bars 54 can be connected to the electric wire(s) W. Moreover, in the circuit configuration connection means A, the plural electric wires W can be short-circuited with each other by the connection bars 54. For this reason, except that the branch connector (including 64, 65 and 66) is formed as the branch section, a predetermined circuit can be configured directly in the circuit configuration connection means A. As a result, one portion of the circuit configuration of the electric connection box 40 can be configured by the circuit configuration connection means A, and the circuit configuration in the electric connection box 40 can be simplified. Therefore, the standards of the electric wires W, the circuit configuration connection means A, the electric connection box 40 and the like can be set to be uniform between power supply systems where the type and standard of cars are different. As a result, the wire harness 50 can be standardized and can be versatile.

Further, in the first embodiment, the circuit configuration connection means A has the laminated body 63, which is constituted by laminating the module plate 51 (52, 53) where the predetermined electric wires W in the electric wire aggregate are arranged independently, and the hood sections 64, 65 and 66 of the split housing 55 to be connected to the connection bars 54 to be connected to the predetermined electric wires W arranged on the arbitrary module plate 51. For this reason, a suitable power can be fed from the split housing 55 to the load side.

In addition, in the circuit configuration method according to the first embodiment, the connection bars 54 are inserted into the arbitrary through holes 58 of the module plate 51 (52, 53) so as to be capable of being easily connected to the bar contact sections 59B on the arbitrary electric connection terminals 59 connected to the predetermined electric wires W. For this reason, when the electric wires W are selected, the positions of the electric wire connection terminals 59 are determined and the electric wires W which are short-circuited by the connection bars 54 are set, arbitrary circuit configuration and wiring branch can be made easily and securely.

Further, in the circuit configuration method according to the first embodiment, when the electric wires W are press-fitted between the press-fitting blades 59c and 59d, the press-fitting blades 59c and 59d easily cut into the covered sections 60 of the electric wires W so that the conductor sections 61 can be connected with the electric wire connection terminals 59 securely. For this reason, in the first embodiment, the electric wires W can be easily attached to the module plate 51 (52, 53) where the electric wire connection terminals 59 are arranged so that the operability can be improved.

In addition, in the circuit configuration method according to the first embodiment, the circuit configuration connection means A has the split housing 55 for housing the laminated body 63, and the branch connector is formed on the split housing 55. For this reason, the laminated body 63 which is constituted by laminating the module plates 51, 52 and 53 can be held in the split housing 55. In the split housing 55, since the electric wires W are held to the module plates 51 (52, 53) securely, the electric wires W can be prevented from hanging.

In addition, in the present embodiment, since both sides of the sub-harnesses SW1, SW2, SW3 and SW4 are connected to the connectors and the module plates, both the sides are in a so-called completed state. As a result, the electric wires do not hang, and the terminals of the end portions of the electric wires can be prevented from being damaged.

Referring now to FIG. 12 to FIG. 15, a second embodiment of the invention will be explained hereinbelow.

Figure 12:
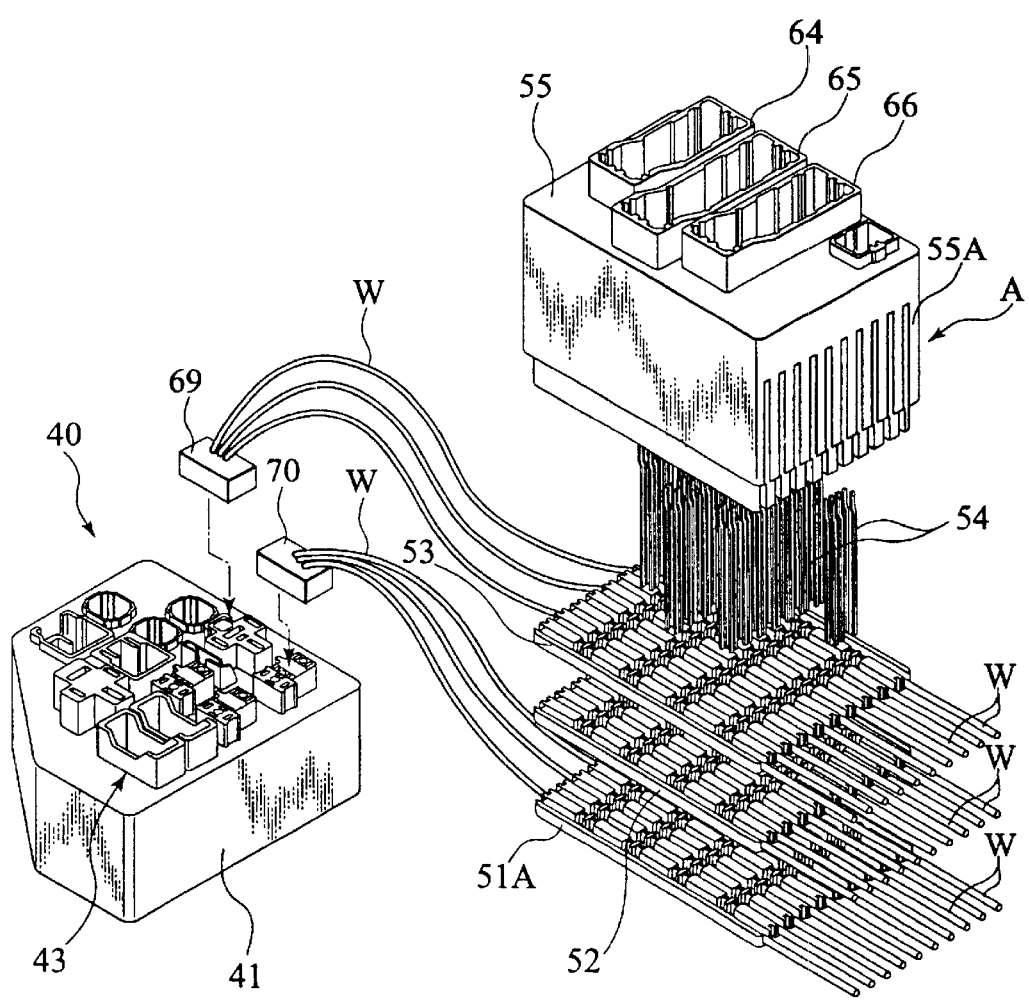
FIG. 12 is an exploded perspective view showing the wire harness circuit configuration method according to a second embodiment of the present invention.

FIG. 12 is an exploded perspective view showing the circuit configuration method of the wire harness according to the second embodiment of the present invention. In the second embodiment, the same reference numerals are given to the parts same as those in the first embodiment, and the description thereof is omitted.

In the second embodiment, as shown in FIG. 12, the middle portions of the predetermined plural electric wires W are connected to electric wire connection terminals (not shown) arranged on module plates 51A and 53. Namely, in the second embodiment, the circuit configuration connection means A can be provided in a position separated from the electric connection box 40. The other end portions of the electric wires W with their middle portions being held to the module plates 51A and 53 are lead out from the module plates 51A and 53 so as to be connected to the connectors 69 and 70.

The branch plate section 42 of the first embodiment is not formed in electric connection box 40 used in the second embodiment, and the electric connection box 40 is composed of a small housing main body 41. The cavities 43 similar to the ones in the first embodiment are formed on the upper face of the housing main body 41. The connectors 69 and 70 are connected to some predetermined cavities of the cavities 43.

In addition, the through holes 58 on the module plates 51 in the first embodiment are not formed on the lowest module plate 51A in the circuit configuration connection means A formed in the second embodiment. The lower ends of the connection bars 54 are received by the module plate 51A. Engagement means (not shown) which is engaged with the lower portion of the split housing 55 is provided on the module plate 51A.

The structure of the second embodiment was explained, but the other parts of the structure in the second embodiment are the same as those in the first embodiment. The second embodiment has the functions and effects which are the same as those in the first embodiment. Particularly in the second embodiment, since the circuit configuration connection means 5A can be provided in a position separated from the electric connection box 40, the electric connection box 40 can be miniaturized, and an installation space for the electric connection box 40 can be reduced. Moreover, in the second embodiment, since the circuit configuration connection means A can be arranged in the vicinity of the load side, the electric wires which are connected to the load side are prevented from hanging.

The first and second embodiments were explained, but the present invention is not limited to them, and various design modifications incidental to the gist of the structure can be made.

Figure 13:
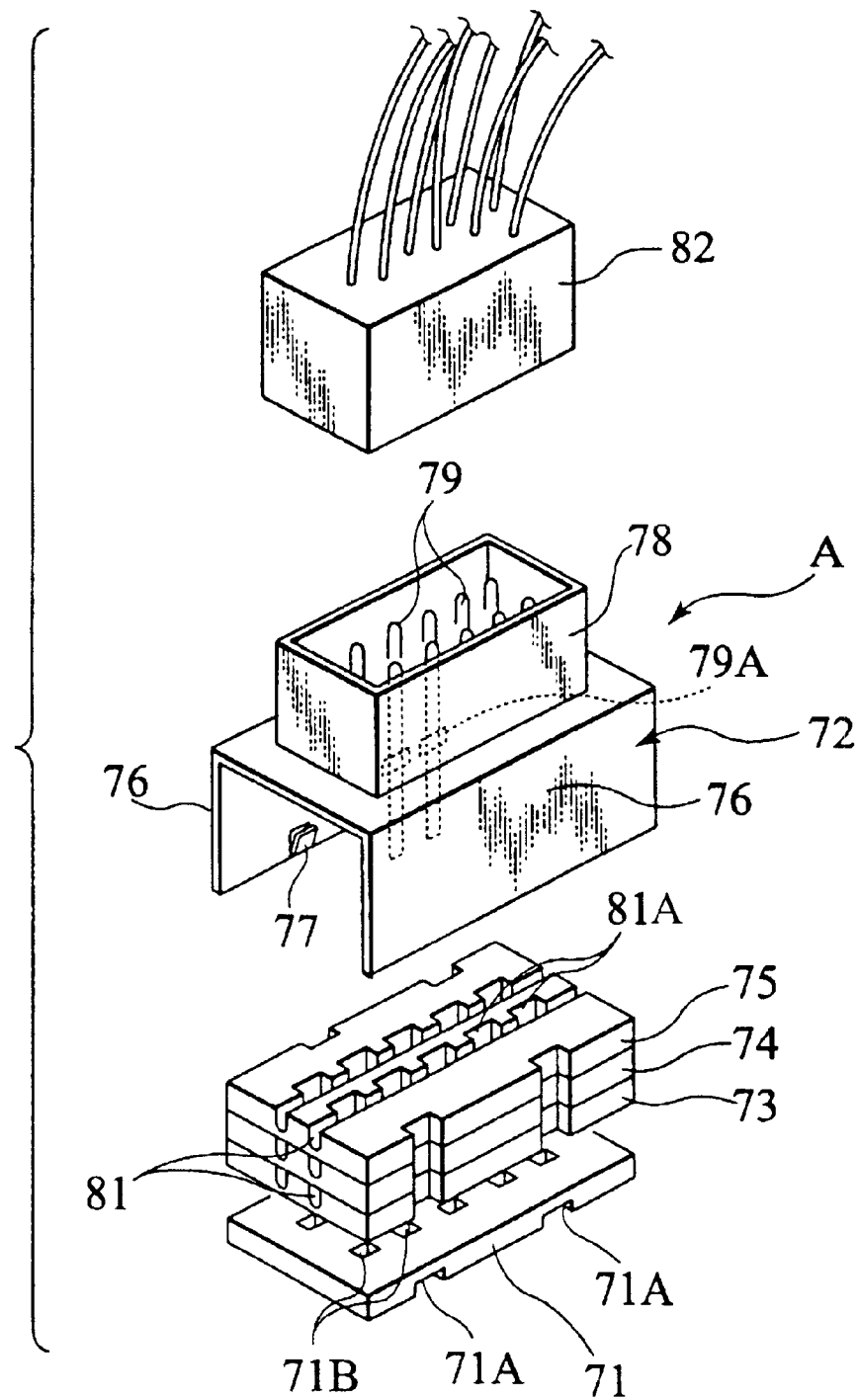
FIG. 13 is an exploded perspective view showing the wire harness circuit configuration method according to a first modified example of the present invention.
Figure 14:
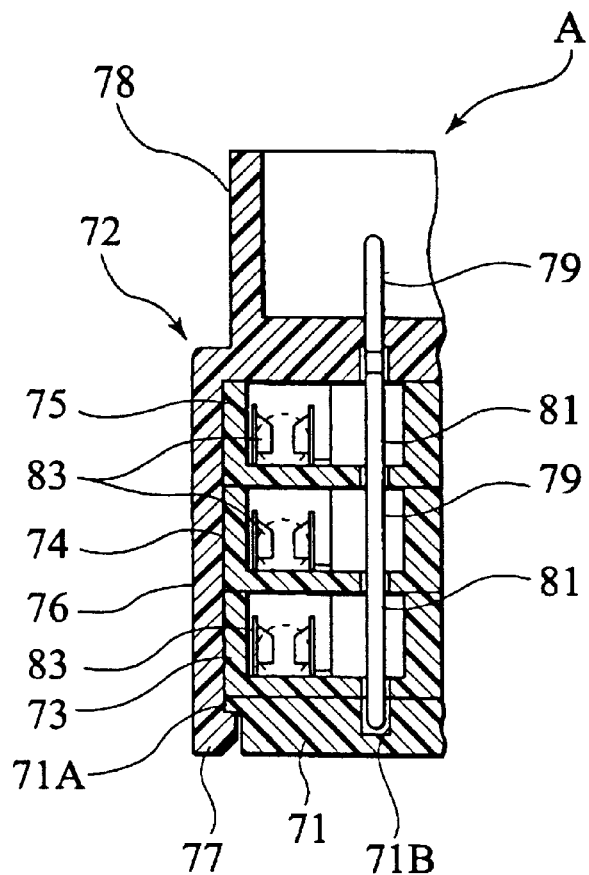
FIG. 14 is a cross section showing a main section of the first modified example.

FIGS. 13 and 14 show a first modified example of the circuit configuration connection means A. In this first modified example, sections to be engaged 71A are formed respectively on both side portions of the lowest bottom plate 71, and concave sections 71B which receive the lower end portions of connection bars 79 are formed on the upper face. Moreover, the split housing 72 is formed in a state that its side surface has a U shaped so as to cover the two side faces and the upper face of the laminated body of the bottom plate 71 and the module plates 73, 74 and 75.

In addition, engagement sections 77, which engage with the sections to be engaged 71A of the bottom plate, are formed respectively at lower portions of the inner faces of the side walls 76 of the split housing 72. Further, a hood section 78 of the branch connector is formed on the upper face of the split housing 72. The middle section of the connection bars 79 are fixed to the inner bottom of the hood section 78.

The upper end sections of the connection bars 79 stand in the hood section 78, and the lower sections hang downward in the split housing 72. Coming-off prevention ribs 79A for easing the fixing to the split housing 72 are formed respectively on the middle sections of the connection bars 79. Moreover, electric wire housing grooves 81 for housing the electric wires W are formed on the module plates 73, 74 and 75, and through holes 81A which are positioned on the sides of the grooves 81 are formed along a lengthwise direction of the electric wire housing grooves 81. The connector 82 in FIG. 13 is a connector of the electric wire groups to be connected to the load side. The connector 82 is fitted into the hood section 78 so as to be connected to the circuit configuration connection means A. The reference numeral 83 in FIG. 14 is an electric wire connection terminal.

In the first modified example, since the coming-off prevention ribs 79A are formed on the connection bars 79, the connection bars 79 can be satisfactorily supported on the split housing 72.

There will be explained below a second modified example of the connection bar with reference to FIG. 15.

Figure 15:
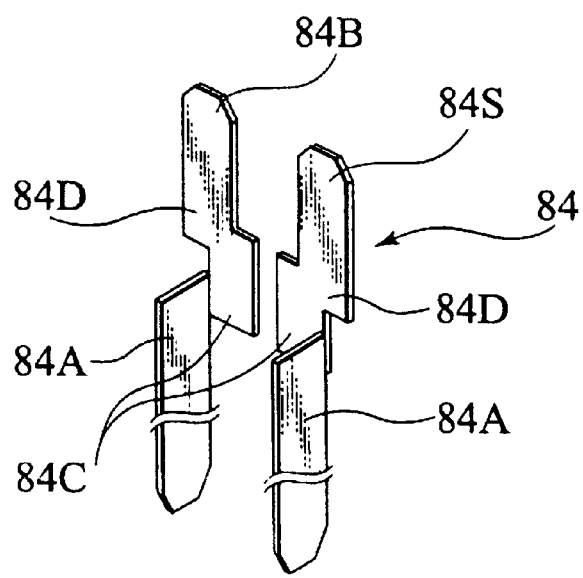
FIG. 15 is a perspective view showing connection bars to be used in the wire harness circuit configuration method according to a second modified example of the present invention.

As shown in FIG. 15, a connection bar 84 of the second modified example is composed of an insertion section 84A which is inserted into the module plate, and a connector terminal section 84B which stand in the hood section of the branch connector. The insertion section 84A and the connector terminal section 84B are bent at 90°. Sections 84C and 84D are extended from the bent sections sideways. The sections 84C and 84D prevent the connection bar from coming out of the split housing, not shown.

The first and second modified examples are applied to the wire harness circuit configuration method of the present invention. As a result, the circuit configuration connection means having the functions and effects which are the same as those in the first and second embodiments can be constituted.

There were explained the first and second embodiments and the first and second modified examples, but the present invention is not limited to them, and various design modifications incidental to the gist of the structure can be made. In the above-mentioned embodiments for example, the covered electric wires W of a single line shape are used, but needless to say, flat cables can be used.

The entire contents of a Japanese Patent Application P11-231899 (filed Aug. 18, 1999) and a Japanese Patent Application P11-231864 (filed Aug. 18, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A method of assembling a wire harness circuit, the method comprising:
providing a plurality of module plates defining a longitudinal direction, wherein each module plate comprises a plurality of partition walls disposed in the longitudinal direction, wire housing grooves between the partition walls, and a plurality of openings spaced in the longitudinal direction proximate to each groove;
attaching wire connection terminals to predetermined wires of a plurality of wire sub-harnesses;
inserting one or more wire connection terminals into selected wire housing grooves;
laminating the module plates on each other so as to form a laminated body;
supporting the laminated body on a support plate, wherein a plurality of circuit elements of a branch circuit are disposed on the support plate;
inserting at least one connection member into the laminated body through the openings to electrically connect selected wire connection terminals on respective module plates to each other and to the branch circuit;
covering the laminated body with a housing so as to prevent exposure of the wire housing grooves, wherein the housing is engageable with the support plate; and
securing the at least one connection member between the support plate and the housing, such that a first end of the at least one connection member engages a respective circuit element on the support plate and a second end of the at least one connection member extends through an opening in the housing.

2. The method of claim 1, wherein the wire connection terminals are connected to end portions or middle portions of the predetermined wires.

3. The method of claim 1, wherein the laminated body and the at least one connection member form one portion of a branch circuit in the housing.

4. The method of claim 1, wherein the openings in each module plate are located in respective gaps in the partition walls.

5. The method of claim 4, wherein each wire connection terminal comprises a wire holding section for receiving a wire, and a bar contact section, offset from the wire holding section in the longitudinal direction, for receiving a connection member.

6. The method of claim 5, wherein the bar contact sections of inserted wire connection terminals are disposed in respective gaps in the partition walls in alignment with respective openings.

7. The method of claim 5, wherein inserting one or more wire connection terminals comprises:
inserting the wire holding section of a respective wire connection terminal into a wire housing groove; and
inserting the bar contact section of the same wire connection terminal into a gap in a partition wall.

8. The method of claim 1, wherein each of the wire sub-harnesses has a first end connected to a connector on a load side and a second end connected to branch wiring of an electric connection box.

9. The method of claim 1, wherein the support plate comprises a module plate without openings.

10. The method of claim 1, wherein the support plate comprises a plurality of recesses for receiving first ends of respective connection members.

11. The method of claim 1, wherein the housing comprises a plurality of wire openings to accommodate the plurality of wires of each wire sub-harness.

12. The method of claim 11, wherein the wire openings on the housing are slot shaped and are aligned with respective grooves on the module plates.

13. A wire harness, comprising:
a plurality of wire sub-harnesses, each wire sub-harness comprising a plurality of wires;
a plurality of wire connection terminals engageable with preselected wires to establish an electrical connection;

a plurality of module plates laminated on each other so as to form a laminated body, each module plate defining a longitudinal direction and comprising:
  a plurality of partition walls disposed in the longitudinal direction;
  wire housing grooves between the partition walls for receiving one or more wire connection terminals; and
  a plurality of openings spaced in the longitudinal direction proximate to each groove;
a support plate supporting the laminated body;
a plurality of circuit elements of a branch circuit disposed on the support plate;
a housing covering the laminated body so as to prevent exposure of the wire housing grooves, wherein the housing is engageable with the support plate; and
at least one connection member insertable into the laminated body through the openings to electrically connect selected wire connection terminals on respective module plates to each other and to the branch circuit, wherein the at least one connection member is secured between the support plate and the housing, such that a first end of the at least one connection member engages a respective circuit element on the support plate and a second end of the at least one connection member extends through an opening in the housing.

14. The wire harness of claim 13, wherein the wire connection terminals have a pair of press-fitting blades, and when the wires are engaged with the press-fitting blades, the press-fitting blades cut into covered sections of the wires so as to contact with conductor sections of the wires.

15. The wire harness of claim 13, wherein the support plate comprises a module plate without openings.

16. The wire harness of claim 13, wherein the support plate comprises a plurality of recesses for receiving first ends of respective connection members.

17. The wire harness of claim 13, wherein the housing comprises a plurality of wire openings to accommodate the plurality of wires of each wire sub-harness.

18. The wire harness of claim 17, wherein the wire openings on the housing are slot shaped and are aligned with respective grooves on the module plates.

19. The wire harness of claim 13, wherein each of the wire sub-harnesses has a first end connected to a load side and a second end connected to a branch circuit on a power supply side.

20. The wire harness of claim 19, further comprising:
  an electric connection box including a connection for the branch circuit.

21. The wire harness of claim 20, wherein the housing covering the laminated body forms a circuit configuration connection means.

22. The wire harness of claim 21, wherein the circuit configuration connection means is provided integrally with the electric connection box.

23. The wire harness of claim 21, wherein the circuit configuration means is provided separately from the electric connection box.

24. The wire harness of claim 21, wherein the circuit configuration connection means forms one portion of the branch circuit in the electric connection box.

25. The wire harness of claim 13, wherein the openings in each module plate are located in respective gaps in the partition walls.

26. The wire harness of claim 25, wherein each wire connection terminal comprises a wire holding section for receiving a wire, and a bar contact section, offset from the wire holding section in the longitudinal direction, for receiving a connection member.

27. The wire harness of claim 26, wherein the bar contact sections of inserted wire connection terminals are disposed in respective gaps in the partition walls in alignment with respective openings.

* * * * *